United States Patent
Li et al.

(10) Patent No.: US 8,913,153 B2
(45) Date of Patent: Dec. 16, 2014

(54) IMAGING SYSTEMS AND METHODS FOR GENERATING MOTION-COMPENSATED HIGH-DYNAMIC-RANGE IMAGES

(71) Applicant: Aptina Imaging Corporation, George Town, Grand Cayman, KY (US)

(72) Inventors: Huai Dong Li, Cupertino, CA (US); Peng Lin, Plesanton, CA (US)

(73) Assignee: Aptina Imaging Corporation, George Town (KY)

( * ) Notice: Subject to any disclaimer, the term of this patent is extended or adjusted under 35 U.S.C. 154(b) by 263 days.

(21) Appl. No.: 13/646,453

(22) Filed: Oct. 5, 2012

(65) Prior Publication Data
US 2013/0100314 A1    Apr. 25, 2013

Related U.S. Application Data

(60) Provisional application No. 61/544,240, filed on Oct. 6, 2011.

(51) Int. Cl.
*H04N 5/228* (2006.01)
*H04N 5/235* (2006.01)
*H04N 5/232* (2006.01)
*H04N 5/238* (2006.01)

(52) U.S. Cl.
CPC .......... *H04N 5/2353* (2013.01); *H04N 5/2355* (2013.01); *H04N 5/23254* (2013.01)
USPC .............. 348/222.1; 348/230.1; 348/252; 348/273; 348/364

(58) Field of Classification Search
USPC ............................. 348/222.1, 230.1, 252, 364
See application file for complete search history.

(56) References Cited

U.S. PATENT DOCUMENTS

| 5,144,442 A | 9/1992 | Ginosar et al. |
| 5,247,366 A | 9/1993 | Ginosar et al. |

(Continued)

FOREIGN PATENT DOCUMENTS

| EP | 2375383 | 12/2011 |
| EP | 2515273 | 10/2012 |

OTHER PUBLICATIONS

Huai Dong Li et al., U.S. Appl. No. 13/755,988, filed Jan. 31, 2013.
Huai Dong Li, U.S. Appl. No. 13/786,199, filed Mar. 5, 2013.

*Primary Examiner* — Ngoc-Yen Vu
(74) *Attorney, Agent, or Firm* — Treyz Law Group

(57) ABSTRACT

Electronic devices may include image sensors. Image sensors may be used to capture images having rows of long-exposure image pixel values that are interleaved with rows of short-exposure image pixel values. The long-exposure and short-exposure values in each interleaved image frame may be interpolated to form interpolated values. A combined long-exposure image and a combined short-exposure image may be generated using the long-exposure and the short-exposure values from the interleaved image frames and the interpolated values from a selected one of the interleaved image frames. The combined long-exposure and short-exposure images may each include image pixel values from either of the interleaved image frames in a non-motion edge region and image pixel values based only on the image pixel values or the interpolated values from the selected one of the interleaved images in a motion or non-edge region. High-dynamic-range images may be generated using the combined long-exposure and short-exposure images.

21 Claims, 10 Drawing Sheets

(56) References Cited

U.S. PATENT DOCUMENTS

| | | |
|---|---|---|
| 6,518,558 B1 | 2/2003 | Bohm et al. |
| 7,084,905 B1 | 8/2006 | Nayar et al. |
| 7,382,407 B2 | 6/2008 | Cho et al. |
| 7,397,509 B2 | 7/2008 | Krymski |
| 7,907,209 B2 | 3/2011 | Au et al. |
| 7,911,518 B2 | 3/2011 | Yosefin |
| 8,013,919 B2 | 9/2011 | Yaffe et al. |
| 8,059,174 B2 * | 11/2011 | Mann et al. ............... 348/273 |
| 8,237,813 B2 | 8/2012 | Garten |
| 8,279,328 B2 | 10/2012 | Lahav et al. |
| 8,305,487 B2 | 11/2012 | Cha et al. |
| 8,405,750 B2 * | 3/2013 | Smith et al. ............... 348/308 |
| 8,625,013 B2 * | 1/2014 | Jannard et al. ............ 348/296 |
| 8,792,019 B2 * | 7/2014 | Yuyama .................... 348/239 |
| 8,798,395 B2 * | 8/2014 | Jo ............................. 382/284 |
| 8,803,985 B2 * | 8/2014 | Kaizu et al. .............. 348/208.4 |
| 2002/0180875 A1 | 12/2002 | Guisdash |
| 2003/0038296 A1 | 2/2003 | Merrill |
| 2003/0103158 A1 | 6/2003 | Barkan et al. |
| 2003/0169359 A1 | 9/2003 | Merrill et al. |
| 2004/0189844 A1 | 9/2004 | McCaffrey et al. |
| 2005/0045980 A1 * | 3/2005 | Guidash ..................... 257/432 |
| 2005/0099504 A1 | 5/2005 | Nayar et al. |
| 2005/0128327 A1 | 6/2005 | Bencuya et al. |
| 2005/0167574 A1 | 8/2005 | He et al. |
| 2006/0145203 A1 | 7/2006 | Toros et al. |
| 2006/0192867 A1 | 8/2006 | Yosefin |
| 2007/0040922 A1 | 2/2007 | McKee et al. |
| 2007/0285526 A1 | 12/2007 | Mann et al. |
| 2008/0158398 A1 | 7/2008 | Yaffe et al. |
| 2008/0219585 A1 * | 9/2008 | Kasai et al. ............... 382/274 |
| 2008/0267522 A1 | 10/2008 | Kobayashi |
| 2009/0021612 A1 | 1/2009 | Hamilton et al. |
| 2009/0040349 A1 | 2/2009 | Xu |
| 2009/0040364 A1 | 2/2009 | Rubner |
| 2009/0256942 A1 | 10/2009 | McCaffrey et al. |
| 2009/0268063 A1 | 10/2009 | Ellis-Monaghan et al. |
| 2009/0273696 A1 | 11/2009 | Krymski |
| 2010/0259636 A1 | 10/2010 | Tzur et al. |
| 2011/0090365 A1 | 4/2011 | Cha et al. |
| 2012/0236169 A1 | 9/2012 | Choe et al. |
| 2012/0281111 A1 * | 11/2012 | Jo et al. .................... 348/229.1 |
| 2012/0287294 A1 | 11/2012 | Kaizu et al. |
| 2012/0328025 A1 | 12/2012 | Chang et al. |

\* cited by examiner

IMAGING SYSTEMS AND METHODS FOR GENERATING MOTION-COMPENSATED HIGH-DYNAMIC-RANGE IMAGES

This application claims the benefit of provisional patent application No. 61/544,240, filed Oct. 6, 2011 which is hereby incorporated by reference herein in its entirety.

BACKGROUND

The present invention relates to imaging devices and, more particularly, to high-dynamic-range imaging systems.

Image sensors are commonly used in electronic devices such as cellular telephones, cameras, and computers to capture images. In a typical arrangement, an electronic device is provided with an image sensor having an array of image pixels and a corresponding lens. Some electronic devices use arrays of image sensors and arrays of corresponding lenses.

In certain applications, it may be desirable to capture high-dynamic range images. While highlight and shadow detail may be lost using a conventional image sensor, highlight and shadow detail may be retained using image sensors with high-dynamic-range imaging capabilities.

Common high-dynamic-range (HDR) imaging systems use a multiple exposure (ME) image capture method. In a ME method, multiple images are captured by the image sensor, each image having a different exposure time. Short-exposure images may retain shadow detail while long-exposure images may retain highlight detail. In a typical device, image pixel values from short-exposure images and long-exposure images are selected to create an HDR image.

When combining sequentially captured images to form HDR images using conventional multiple exposure HDR image combination methods, changes in position of moving objects in the multiple images can result in motion artifacts in the combined HDR image.

It would therefore be desirable to provide improved imaging systems with motion-compensation capabilities for high-dynamic-range imaging.

DETAILED DESCRIPTION

Imaging systems are widely used in electronic devices such as digital cameras, computers, cellular telephones, and other electronic devices. These electronic devices may include image sensors that gather incoming light to capture an image. The image sensors may include at least one image pixel array. The pixels in the image pixel array may include photosensitive elements such as photodiodes that convert the incoming light into digital data. Image sensors may have any number of pixels (e.g., hundreds or thousands or more). A typical image sensor may, for example, have hundreds of thousands or millions of pixels (e.g., megapixels).

Figure 1:
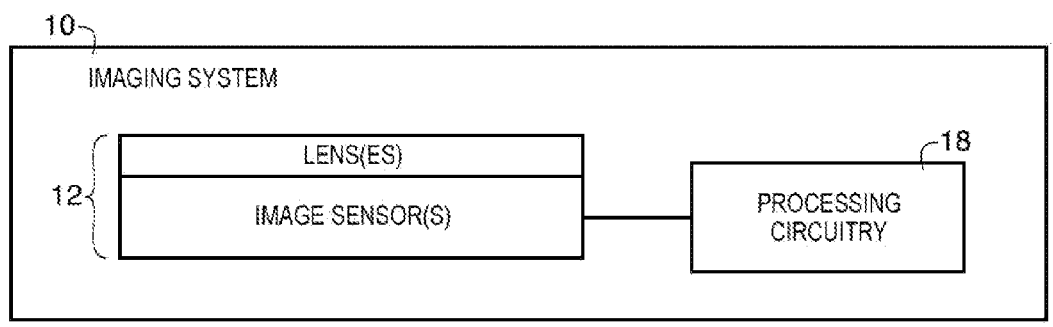
FIG. 1 shows an illustrative imaging device that can be used to capture motion-compensated high-dynamic-range images in accordance with an embodiment of the present invention.

FIG. 1 is a diagram of an illustrative electronic device that uses an image sensor to capture images. Electronic device 10 of FIG. 1 may be a portable electronic device such as a camera, a cellular telephone, a video camera, or other imaging device that captures digital image data. Device 10 may include a camera module such as camera module 12 coupled to control circuitry such as processing circuitry 18. Camera module 12 may be used to convert incoming light into digital image data. Camera module 12 may include one or more lenses 14 and one or more corresponding image sensors 16. During image capture operations, light from a scene may be focused onto each image sensors 16 using a respective lens 14. Lenses 14 and image sensors 16 may be mounted in a common package and may provide image data to processing circuitry 18.

Processing circuitry 18 may include one or more integrated circuits (e.g., image processing circuits, microprocessors, storage devices such as random-access memory and non-volatile memory, etc.) and may be implemented using components that are separate from image sensor 16 and/or that form part of image sensor 16 (e.g., circuits that form part of an integrated circuit that controls or reads pixel signals from image pixels in an image pixel array on image sensor 16 or an integrated circuit within image sensor 16). Image data that has been captured by image sensor 16 may be processed and stored using processing circuitry 18. Processed image data may, if desired, be provided to external equipment (e.g., a computer or other device) using wired and/or wireless communications paths coupled to processing circuitry 18.

The dynamic range of an image may be defined as the luminance ratio of the brightest element in a given scene to the darkest element the given scene. Typically, cameras and other imaging devices capture images having a dynamic range that is smaller than that of real-world scenes. High-dynamic-range (HDR) imaging systems are therefore often used to capture representative images of scenes that have regions with high contrast, such as scenes that have portions in bright sunlight and portions in dark shadows.

An image may be considered an HDR image if it has been generated using imaging processes or software processing designed to increase dynamic range. As an example, HDR images may be captured by a digital camera using a multiple integration (or multiple exposure (ME)) process. In a multiple exposure process, multiple images (sometimes referred to as image frames) of the same scene may be captured using different exposure (or integration) times. A short-exposure image captured during a short integration time may better capture details of brightly lit portions of the scene, whereas a long-exposure image captured during a relatively longer integration time may better capture details of dark portions of the scene. The short-exposure and long-exposure images may be combined into a composite HDR image that accurately represents the brightly lit as well as the dark portions of the image.

When capturing HDR images using ME imaging methods, or any HDR imaging system using sequentially captured images, a moving object or stationary objects in a scene captured by a moving (e.g., shaking) camera will often be registered at different pixel positions in each image. When the images are combined using conventional multiple exposure HDR image combination methods, the discrepancy in position and/or shape of a moving object in the multiple exposures can result in motion artifacts in the combined HDR image. Common ME imaging systems use a Bayer color filter patterned image sensor. In high-dynamic-range imaging systems having an image sensor with an image pixel array with a Bayer pattern color filter, motion artifacts such as mis-registered objects can include color distortion of objects as well as positional distortions in combined HDR images.

Figure 2:
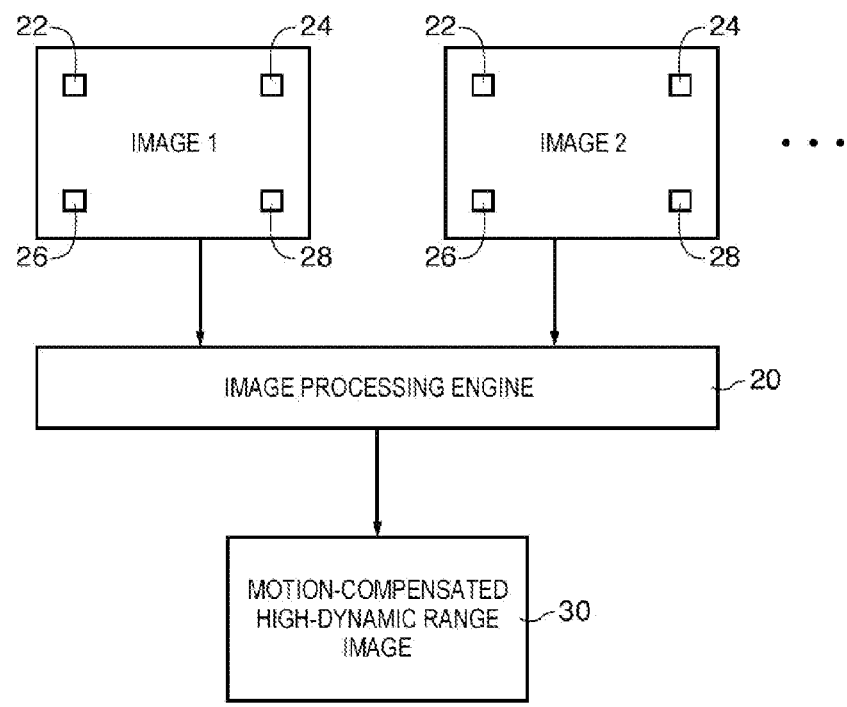
FIG. 2 is a diagram of illustrative first and second image frames showing how the image frames may be passed to an image processing engine and processed to form a motion-compensated high-dynamic range image in accordance with an embodiment of the present invention.

In order to reduce these types of motion artifact, device 10 may include a motion-compensating high-dynamic-range image processing engine such as image processing engine 20 of FIG. 2. As shown in FIG. 2, image processing engine 20 may be used to combine first and second images (e.g., image 1 and image 2) captured using camera module 12 to form motion-compensated high-dynamic-range image 30 in which image pixel values from each of image 1 and image 2 have been optimally processed and combined to form the motion-compensated high-dynamic-range image. Image processing engine 20 may be formed as a portion of processing circuitry 18 of FIG. 1, as circuitry on a common substrate with image sensor(s) 16, or may be implemented as software running on processing circuitry 18 or circuitry associated with image sensor(s) 16.

Each image (or image frame) may include regions of high light such as high light region 22, regions of low light such as low light region 24, regions including edges of objects such as edge region 26, and regions including moving objects such as motion region 28. Image processing engine 20 may be used to identify image pixels that make up regions 22, 24, 26, and/or 28 in each image. Image processing engine 20 may use image pixel values from image pixels in identified regions 22, 24, 26, and 28 in forming motion-compensated HDR image 30.

Regions 22, 24, 26, and 28 are shown as separate portions of images 1 and 2. However, this is merely illustrative. Regions 22, 24, 26, and/or 28 may be separate regions of an image or may be overlapping or partially overlapping regions of an image. For example, a moving object may be a brightly lit moving object having a sharp edge. Image pixels that include this type of brightly lit moving object having a sharp edge may be identified by image processing engine 20 as image pixels in highlight region 22, edge region 26, and motion region 28. Regions 22, 24, 26, and 28 are shown as square regions. However, this is merely illustrative. If desired, regions 22, 24, 26, and/or 28 may have other shapes, may be continuous regions or may be discontinuous regions.

Some HDR imaging systems use frame-sequential exposures in which an entire image frame is captured (i.e., all pixels in a pixel array accumulate image data) using a first exposure time before the subsequent image frame is captured using a second exposure time. Other HDR imaging systems use row-sequential exposures in which a selection of pixel rows capture an image of a portion of a scene (i.e. a portion of an image frame) using a first exposure time and the same selection of pixel rows is used to capture a second image of the same portion of the scene using a second exposure time before subsequent rows are used to repeat the multiple exposure imaging process.

If desired, row-sequential exposures may be performed in which a selection of pixel rows are used to capture an image of a portion of a scene (i.e., a portion of an image frame) using a first exposure time, a subsequent selection of pixel rows are used to capture an image of a an additional portion of the scene using a second exposure time and this process is repeated until pixel rows have been used to capture an image having image pixel values with interleaved exposure times. In this type of row-sequential image capture operation, a subsequent image may be captured using the second exposure time for the first selection of pixel rows, the first exposure time for the subsequent selection of pixel rows, and so on until all pixels rows have been used to capture a second image having image pixel values with interleaved exposure times.

Figure 3:
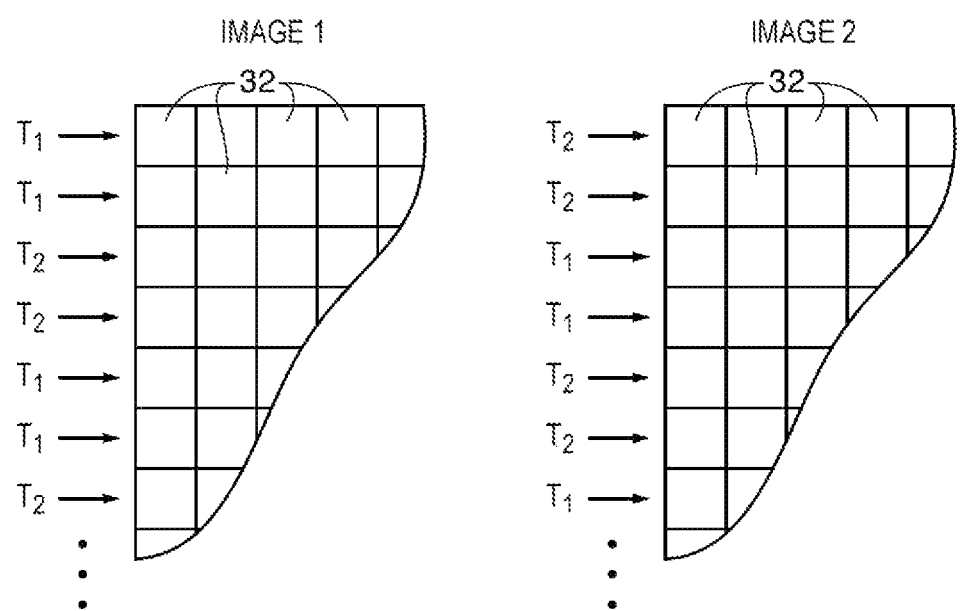
FIG. 3 is a diagram of illustrative first and second image frames each having image pixel values captured using long exposure times and image pixel values captured using short exposure times in accordance with an embodiment of the present invention.

As shown in FIG. 3, each image (e.g., image 1 and image 2) may include image pixel values 32 representing the amount of charge generated by light that was incident on a corresponding image pixel in an image pixel array in image sensor 16. Image pixel values for some rows of image pixel values 32 may have been captured using a first exposure time T1 and image pixel values for other rows of image pixel values 32 may have been captured using a second exposure time T2. Exposure time T1 may be greater than exposure time T2 so that after both images 1 and 2 have been captured, a long-exposure and a short-exposure image pixel value will have been obtained by each image pixel.

In the example of FIG. 3, the image pixel values 32 in the first two rows of image 1 are long-exposure image pixel values (i.e., image pixel values captured using exposure time T1) and image pixel values 32 in the second two rows of image 1 are short-exposure image pixel values (i.e., image pixel values captured using exposure time T2). This pattern of capturing alternating sets of rows of short and long exposure image pixel values may be repeated until a full interleaved image has been captured. The process may be repeated when capturing image 2 with exposure times T1 and T2 reversed with respect to image 1.

Interleaved images of the type shown in FIG. 2 may be capturing by alternating exposure times for each adjacent row of image pixels, every two rows of image pixels, every three rows of image pixels, or for larger groups of rows of image pixels.

Figure 4:
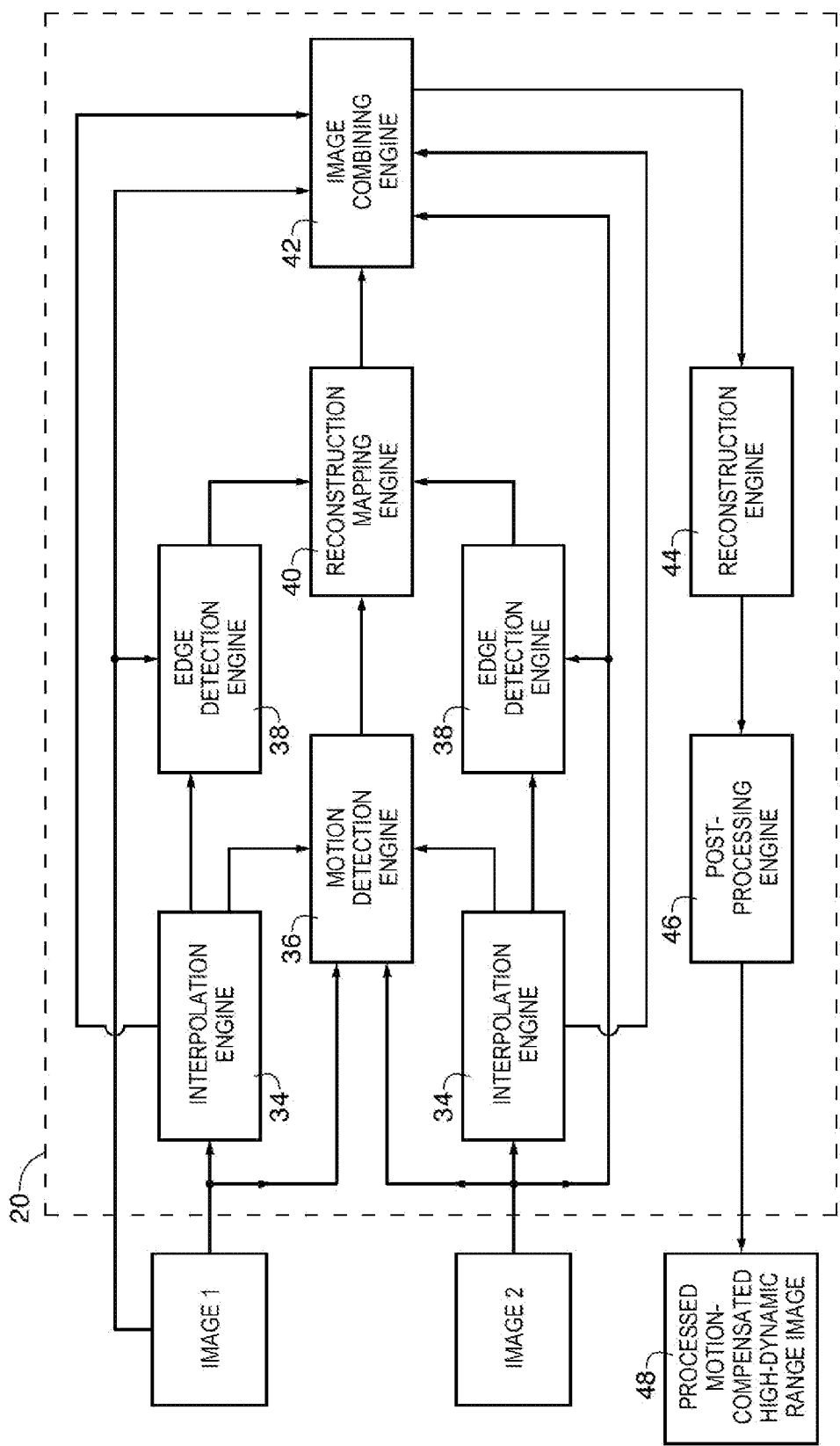
FIG. 4 is a flow diagram showing how various processing engines in an imaging system may be used to combine first and second images to form motion-compensated high-dynamic-range images in accordance with an embodiment of the present invention.

Interleaved images 1 and 2 may be processed and combined using image processing engine 20 as shown in FIG. 4. Image processing engine 20 may include sub-processing engines such as interpolation engines 34, motion detection engine 36, edge detection engines 38, reconstruction mapping engine 40, image combination engine 42, reconstruction engine 44, and post-processing engine 46.

Interpolation engines 34 may be used for generating an interpolated long-exposure image and an interpolated short-exposure image from each of images 1 and 2. Motion detection engine 36 may be used to detect regions of motion between images 1 and 2. Edge detection engines 38 may be used to detect edge regions in images 1 and 2. Reconstruction mapping engine 40 may be used to combine detected edge regions and detected motion regions to generate reconstruction maps to be used in forming final short-exposure and long-exposure images from images 1 and 2. Image combining engine 42 may be used to form final short-exposure and long-exposure images using the reconstruction map, image 1, image 2, and the interpolated long-exposure and short-exposure images generated from a selected one of image 1 or image 2. Reconstruction engine 44 may be used to form a motion-compensated high-dynamic-range image such as image 30 of FIG. 2 from the final short-exposure and long-exposure images. Post-processing engine 46 may be used to perform additional processing operations on the motion-compensated high-dynamic-range image (e.g., smoothing, filtering, red-eye correction, or other processing operations) to form a processed motion-compensated high-dynamic-range image 48.

Figure 5:
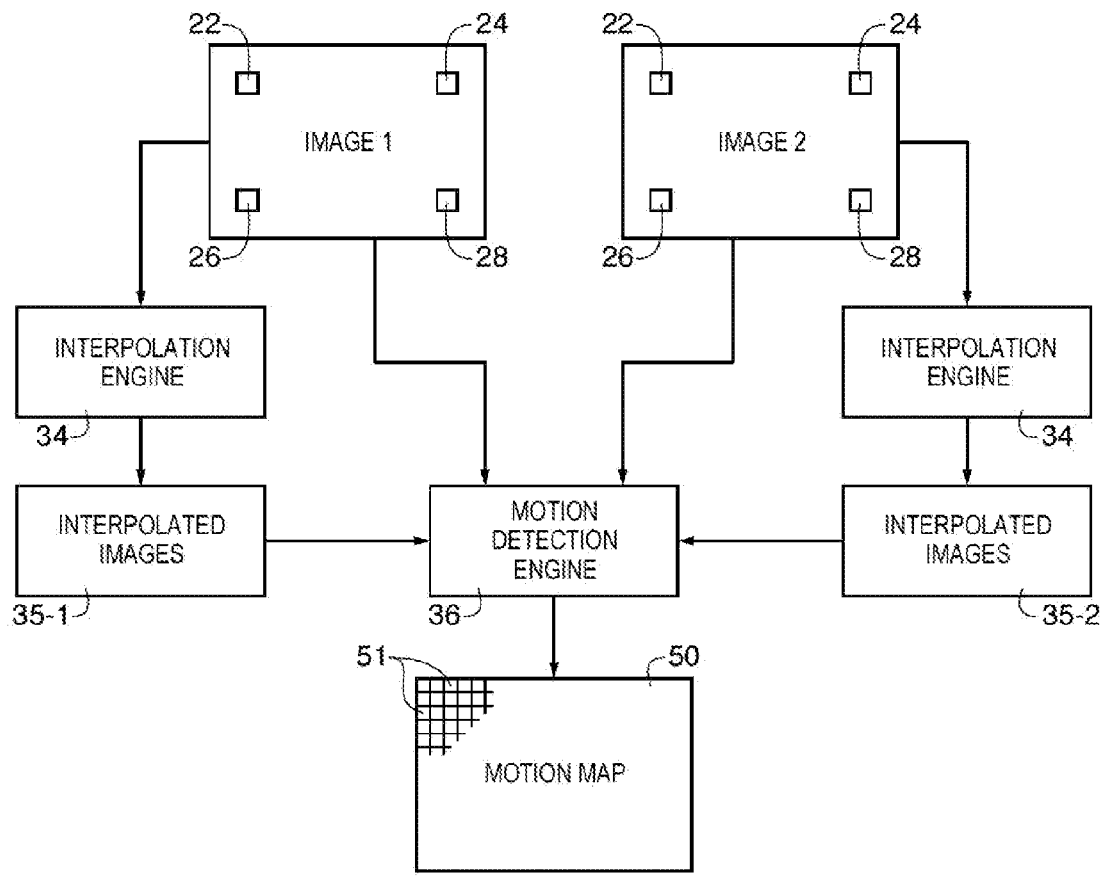
FIG. 5 is an illustrative diagram showing how a motion-detection engine may be used to generate a motion map from first and second images in accordance with an embodiment of the present invention.

FIG. 5 is a diagram showing how motion detection engine 36 may be used to generate a motion map from first and second image frames such as interleaved images 1 and 2. Motion detection engine 36 may be used to detect differences between corresponding image pixel values in image 1 and image 2 to detection motion regions 28 in images 1 and 2. Motion detection engine 36 may generate motion map 50 based on the detected differences between corresponding image pixel values in image 1 and image 2.

As shown in FIG. 5, interpolation engines 34 may be used to generate interpolated images 35-1 from interleaved image 1 and interpolated images 35-2 from interleaved image 2. Interpolated images 35-1 may include an interpolated long-exposure image having interpolated image pixel values based on the long-exposure image pixel values in interleaved image 1 and an interpolated short-exposure image having interpolated image pixel values based on the short-exposure image pixel values in interleaved image 1. Interpolated images 35-2 may include an interpolated long-exposure image having interpolated image pixel values based on the long-exposure image pixel values in interleaved image 2 and an interpolated short-exposure image having interpolated image pixel values based on the short-exposure image pixel values in interleaved image 2.

Some or all of interpolated images 35-1 and 35-2 may also be provided to motion detection engine 36. If desired, motion detection engine 36 may be used to detect differences between corresponding interpolated image pixel values in interpolated images 35-1 and 35-2 in addition to or in place of detecting differences between corresponding pixel values in images 1 and 2 to detection motion regions 28 in images 1 and 2. Motion detection engine 36 may generate motion map 50 based on the detected differences between corresponding image pixel values in image 1 and image 2, based on the detected differences between corresponding image pixel values in interpolated images 35-1 and 35-2, or based on the detected differences between corresponding image pixel values in images 1 and 2 and interpolated images 35-1 and 35-2.

Motion map 50 may be an array of motion map pixel values 51, each value 51 corresponding to a single overlapping image pixel in image 1 and image 2. Each value 51 in the motion mask may indicate the likelihood of the corresponding pixel in either image 1 or image 2 belonging to a moving object (e.g., a value of 1 may indicate a pixel belonging to a moving object while a value of 0 may indicate a pixel does not belong to a moving object).

As an example, a method for producing motion map 50 from two sequential image frames may include generating luma images from images 1 and 2, (e.g., by convolving each image frame with a luma operator such as a high-pass filter), combining the luma images to a mean-absolute-difference (MAD) image by computing, for each pixel, the MAD of a surrounding group of pixels in the luma images, and combining the MAD image with a noise model to generate motion map 50. The noise model may be based on one or both images 1 and 2, may be based on one or both luma images, may be based on a combination of images and the luma images, or may be based on a combination of pixel values from one of image 1 and 2 and one of the generated luma images. The pixels in motion mask 50 having non-zero values may make up detected motion regions 28.

Figure 6:
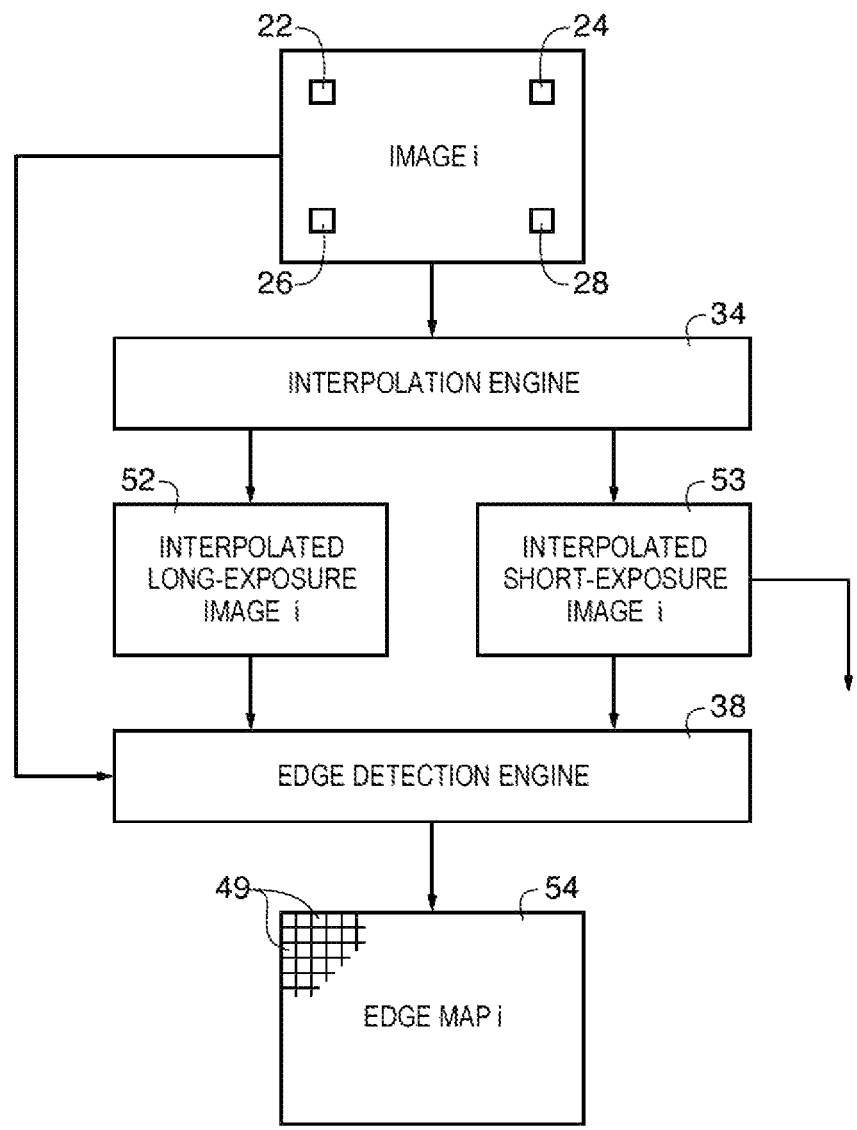
FIG. 6 is an illustrative diagram showing how an interpolation engine and an edge detection engine may be used to generate interpolated images and an edge map from each of multiple images in accordance with an embodiment of the present invention.

FIG. 6 is a diagram showing how interpolation engine 34 may be used to generate multiple interpolated images from an ith image such as one of interleaved image 1 (i.e., i=1) or image 2 (i.e., i=2). Interpolation engine 34 may generate an interpolated long-exposure image 52 from image 1 (i.e., i=1) by generating interpolated image pixel values for all pixel locations in image 1 having short-exposure image pixel values 32 (e.g., by interpolating the long-exposure image pixel values 32 in image 1). Similarly, interpolation engine 34 may generate an interpolated short-exposure image 53 from image 1 (i.e., i=1) by generating interpolated image pixel values based on short-exposure image pixel values 32 in image 1 for pixel locations having long-exposure image pixel values in image 1. In this way, two images (short-exposure interpolated image 53 and long-exposure interpolated image 52) can be generated from image 1. Interpolation engine 34 may also be used to generate an interpolated short-exposure image 53 from image 2 (i.e., i=2) and an interpolated long-exposure image 52 from image 2 (i.e., i=2).

For i=1, interpolated long-exposure image 52 may include image pixel values 32 from image 1 in rows in which exposure time T1 was used to capture the image pixel values and may contain interpolated long-exposure values in rows in which exposure time T2 was used to capture the image pixel values. Interpolated short-exposure image 53 may include image pixel values 32 from image 1 in rows in which exposure time T2 was used to capture the image pixel values and may contain interpolated short-exposure values in rows in which exposure time T1 was used to capture the image pixel values.

For i=2, interpolated long-exposure image 52 may include image pixel values 32 from image 2 in rows in which exposure time T1 was used to capture the image pixel values and may contain interpolated long-exposure values in rows in which exposure time T2 was used to capture the image pixel values. Interpolated short-exposure image 53 may include image pixel values 32 from image 2 in rows in which exposure time T2 was used to capture the image pixel values and may contain interpolated short-exposure values in rows in which exposure time T1 was used to capture the image pixel values.

As shown in FIG. 6, an ith edge map 54 may be generated using edge detection engine 38 for the ith image (e.g., for each integer value of i from 1 to 2) using the ith interpolated long-exposure image. However, this is merely illustrative. If desired, the ith edge map 54 may be generated using image i, interpolated short-exposure image i, interpolated long-exposure image i, or any combination of data from those images.

Edge detection engine 38 may generate edge map 54 by detecting edges in an interpolated image and generating an array of edge pixel values 49 that indicate whether an edge has been detected in each pixel and the direction in which that detected edge is oriented. For example, each edge pixel value 49 may be an integer value in the range 0-4 in which 0 indicates no edge has been detected at that pixel location, 1 indicates that a horizontal edge has been detected at that pixel location, 2 indicates that a vertical edge has been detected, 3 indicates that a 45 degree diagonal edge has been detected, and 4 indicates that a 135 degree diagonal edge has been detected.

The edge pixel value 49 may be determined by selecting a pixel value such as a green pixel value G (an original green pixel value or an interpolated green pixel value) and obtaining green pixel values G1, G2, G3, and G4, located at the four adjacent corners of the selected green pixel value G. A gradient value GR in the direction of each adjacent corner of the selected pixel may be determined (e.g., by subtracting the corresponding adjacent pixel value (G1, G2, G3 or G4) from the selected pixel value G and determining the absolute value of those subtractions), calculating the maximum of those gradient values (e.g., max(GR1=|G1−G|, GR2=|G2−G|, GR3=|G3−G|, GR4=|G4−G|)), and comparing the maximum of the gradient values to a threshold value. If the maximum of the gradient values is above the threshold value, edge detection engine 38 may determine that an edge has been detected at the location of the selected pixel. This process may be repeated for each pixel (or for each green pixel) until a map of edge detection pixel values corresponding to each pixel (or each green pixel) has been generated.

The edge pixel values 49 for edge pixels in which an edge has been detected (e.g., directional edge indices 1, 2, 3, or 4) may then be generated by determining whether the two smallest gradient values are horizontally, vertically, 45 degree diagonally or 135 degree diagonally oriented about the selected green pixel.

Based on edge maps 54 and motion map 50, either image 1 or image 2 may be selected as a reference frame. Motion-compensated high-dynamic-range images may be generated by image pixel values from image 1 and image 2 in non-motion regions and using image pixel values from the reference frame and the interpolated images 52 and 53 that were generated from that reference frame to form the image pixel values in a motion region for the motion-compensated high-dynamic-range images.

Figure 7:
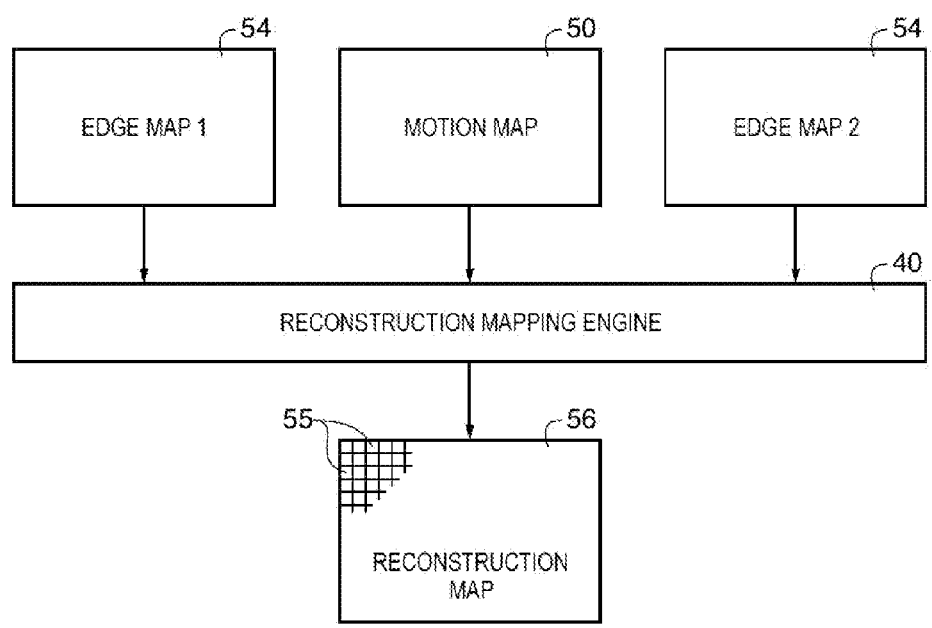
FIG. 7 is an illustrative diagram showing how a reconstruction mapping engine may be used to generate a motion map from first and second edge maps and a motion map in accordance with an embodiment of the present invention.

FIG. 7 is a diagram showing how reconstruction mapping engine 40 may generate reconstruction map 56 from first and second edge maps 54, and motion map 50. Reconstruction map 56 may include an array of reconstruction map pixel values 55 each corresponding to a pixel of the eventual high-dynamic range image. The reconstruction map pixel values 55 may be equal to 1 when the corresponding edge direction index in the corresponding pixel in both edge maps is the same and when the motion map value at that pixel is equal to zero. The reconstruction map pixel values 55 may be equal to zero otherwise. The reconstruction map may be smoothed using a low-pass filter before being passed to image combining engine 42.

Figure 8:
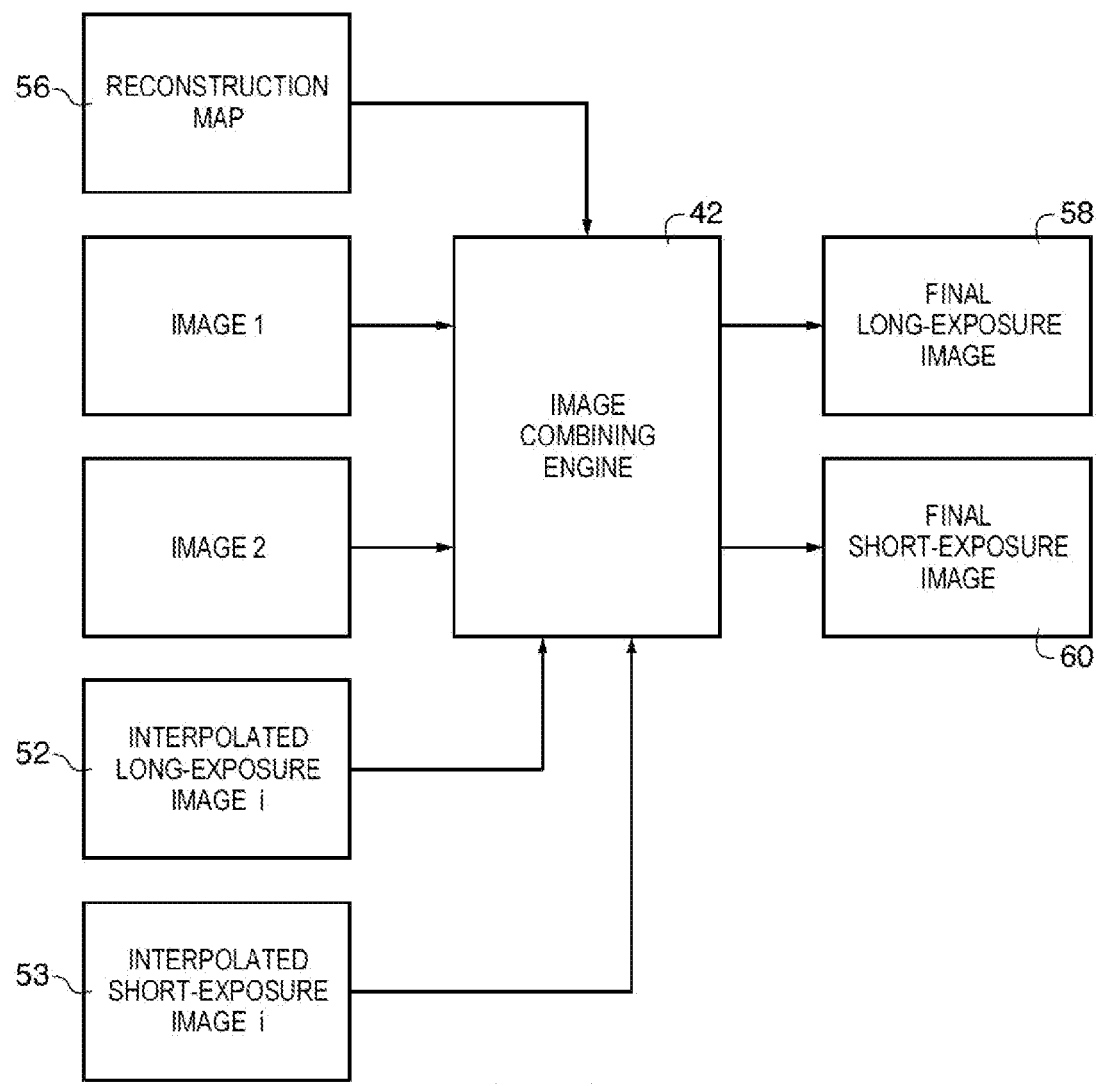
FIG. 8 is an illustrative diagram showing how an image-combining engine may be used to generate a combined long-exposure image and a combined short-exposure image using a reconstruction map, first and second images, and first and second interpolated images in accordance with an embodiment of the present invention.

FIG. 8 is a diagram showing how image combining engine 42 may use reconstruction map 56, image 1, image 2, and interpolated images 52 and 53 that were generated based on a selected one of image 1 or image 2 to generate a final long-exposure image 58 and a final short-exposure image 60. Image combining engine 42 may select either image 1 or image 2 as a reference frame based on edge statistics and motion statistics from each image. Image combining engine 42 may use image 1, image 2, and the interpolated long-exposure image and the interpolated short-exposure image that were generated based on the image that was chosen as the reference frame to generate the final long-exposure image frame and the final short-exposure image frame. Image combining engine 42 may populate each image pixel value in final long-exposure image 58 and final short-exposure image 60 by choosing image pixel values from image 1, image 2, interpolated long-exposure image 52, and/or interpolated short-exposure image 53 based on the value of the corresponding pixel in reconstruction map 56.

For example, a reconstruction map pixel value 55 that is equal to one may indicate that the corresponding pixel value in image 58 should be a long-exposure image pixel value taken directly from image 1 or image 2. The long-exposure image pixel value to be used to form the corresponding pixel value in image 58 may be taken from an overlapping image pixel in image 1 if the overlapping image pixel in image 1 is a long-exposure image pixel value. If the overlapping image pixel in image 1 is a short-exposure image pixel value, then the long-exposure image pixel value to be used to form the corresponding pixel value in image 58 may be taken from an overlapping image pixel in image 2.

A reconstruction map pixel value 55 that is equal to one may also indicate that the corresponding pixel value in image 60 should be a short-exposure image pixel value taken directly from image 1 or image 2. The short-exposure image pixel value to be used to form the corresponding pixel value in image 60 may be taken from an overlapping image pixel in image 1 if the overlapping image pixel in image 1 is a short-exposure image pixel value. If the overlapping image pixel in image 1 is a long-exposure image pixel value, then the short-exposure image pixel value to be used to form the corresponding pixel value in image 58 may be taken from an overlapping image pixel in image 2.

A reconstruction map pixel value 55 that is equal to zero may indicate that the corresponding pixel value in image 58 should be a long-exposure image pixel value taken from interpolated long-exposure image 52 and that the corresponding pixel value in image 60 should be a short-exposure image pixel value taken from interpolated short-exposure image 53. As described above in connection with FIG. 6, a long-exposure image pixel value taken from interpolated long-exposure image 52 may be an interpolated long-exposure image pixel value or a long-exposure image pixel value taken directly from the selected reference image. A short-exposure image pixel value taken from interpolated short-exposure image 53 may be an interpolated short-exposure image pixel value or a short-exposure image pixel value taken directly from the selected reference image.

In this way, motion artifacts may be reduced by using image pixel values in images 58 and 60 that are based on multiple captured images in non-motion regions and based on a single captured image (i.e., image pixel values from the reference frame or interpolated long or short image pixel values based on the image pixel values from the reference frame) in motion regions.

Figure 9:
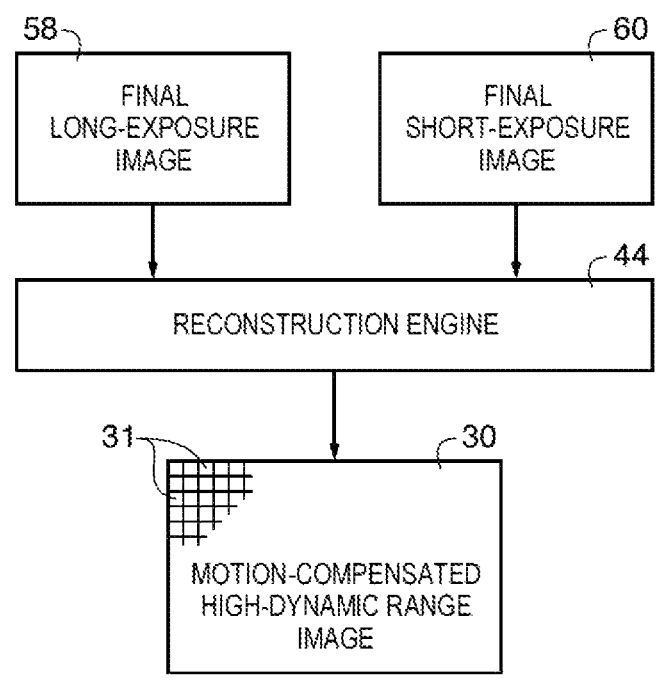
FIG. 9 is an illustrative diagram showing how a reconstruction engine may be used to generate a motion-compensated high-dynamic-range image from first and second single-exposure images in accordance with an embodiment of the present invention.

FIG. 9 is a diagram showing how reconstruction engine 44 may be used to generate motion compensated high-dynamicrange image 30 by selecting image pixel values from final long-exposure image 58 and final short-exposure image 60.

Each image pixel value 31 in motion-compensated HDR image 30 (i.e., image pixel value 31 located at pixel positions (x,y) in image 30) may be determined using any linear combination of the pixel values in final long-exposure image (FLEI) 58 and final short-exposure image (FSEI) 60. In one embodiment, the pixel values 31 in motion-compensated HDR image (MCHDR) 30 may be determined using the following equation:

$$MCHDR(x, y) = \begin{cases} FLEI(x, y), & \text{if } FLEI(x, y) < S_1 \\ R \cdot FSEI(x, y), & \text{if } FLEI(x, y) \geq S_2 \\ [(1 - kc) \cdot R \cdot FSEI(x, y) + kc \cdot FLEI(x, y)], & \text{if } S_1 \leq FLEI(x, y) < S_2, \end{cases} \quad (1)$$

where R is a ratio of exposure times T1 and T2, and where $S_1$ and $S_2$ are preselected knee points for the HDR linear combination. The parameter kc may be a weighting factor that depends on the value of the pixel in image 58 at location (x,y), and knee points $S_1$ and $S_2$. For example, kc may be given by the equation $kc=(FLEI(x,y)-S_1)/(S_2-S_1)$.

Figure 10:
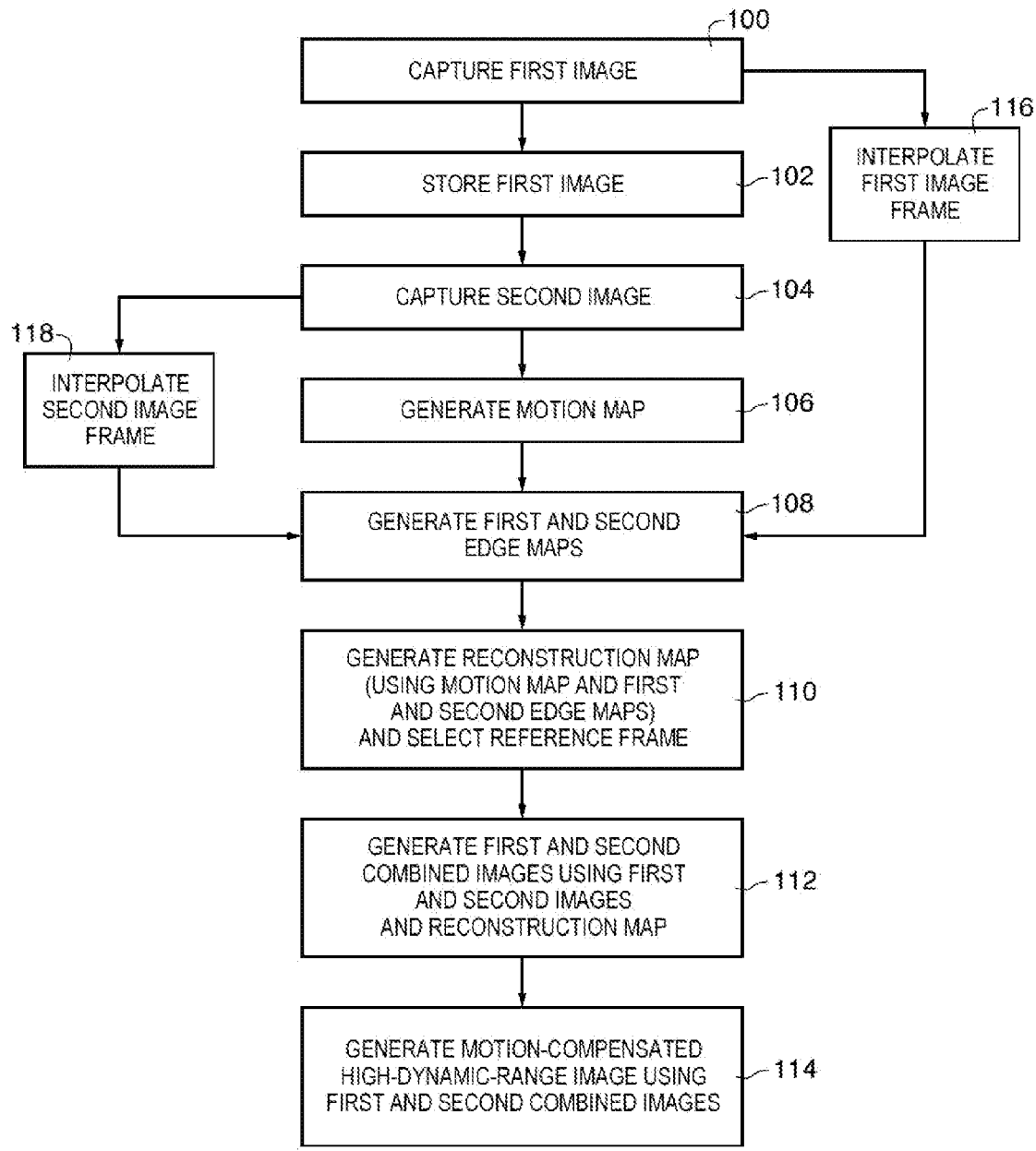
FIG. 10 is a flowchart of illustrative steps that may be involved in generating a motion-compensated high-dynamic-range image from multiple image frames in accordance with an embodiment of the present invention.

Illustrative steps that may be used in generating a motion-compensated high-dynamic-range image such as image 30 by optimally combining two or more interleaved images such as images 1 and 2 are shown in FIG. 10.

At step 100, a first image may be captured using an image sensor of the type shown in FIG. 1. Capturing the first image may include capturing an interleaved image that includes image pixel values captured using a first exposure time and image pixel values captured using a second exposure time. The image pixel values captured using the first and second exposure times may be located in alternating pixel rows, in alternating sets of pixel rows, or may be otherwise distributed within the first image.

At step 102, the first image may be stored (e.g., using a frame buffer on the image sensor).

At step 104, a second image may be captured. Capturing the second image may include capturing an interleaved image that includes image pixel values captured using the first exposure time and image pixel values captured using the second exposure time. The image pixel values captured using the first and second exposure times may be in alternating pixel rows, in alternating sets of pixel rows, or may be otherwise distributed within the second image and may be arranged opposite to the arrangement of the image pixel values in the first image.

At step 106, a motion map such as motion map 50 of FIG. 5 may be generated using the first and second captured images as described above in connection with FIG. 5.

At step 116, the first image may be interpolated to form a first interpolated long-exposure image and a first interpolated short-exposure image as described above in connection with FIG. 6.

At step 118, the second image may be interpolated to form a second interpolated long-exposure image and a second interpolated short-exposure image as described above in connection with FIG. 6.

At step 108, first and second edge maps may be generated using the first and second interpolated long-exposure images as described above in connection with FIG. 6.

At step 110, a reconstruction map may be generated using the motion map and the first and second edge maps as described above in connection with FIG. 7. The first image or the second image may also be selected as a reference frame based on the motion map and the first and second edge maps.

At step 112, first and second combined images such as final long-exposure image 58 and final short-exposure image 60 may be generated using the reconstruction map. Generating the first and second combined images may include generating the first and second combined images using the reconstruction map, the first image, the second image, the interpolated long-exposure image generated from the image selected as the reference frame and the interpolated short-exposure image generated from the image selected as the reference frame as described above in connection with FIG. 8.

At step 114, a motion-compensated high-dynamic-range image such as image 30 of FIGS. 2 and 9 may be generated using the first and second combined images. Generating the motion-compensated high-dynamic-range image may include combining the first and second combined images (e.g., final long-exposure image 58 and final short-exposure image 60) according to equation 1 above, as described in connection with FIG. 9.

Figure 11:
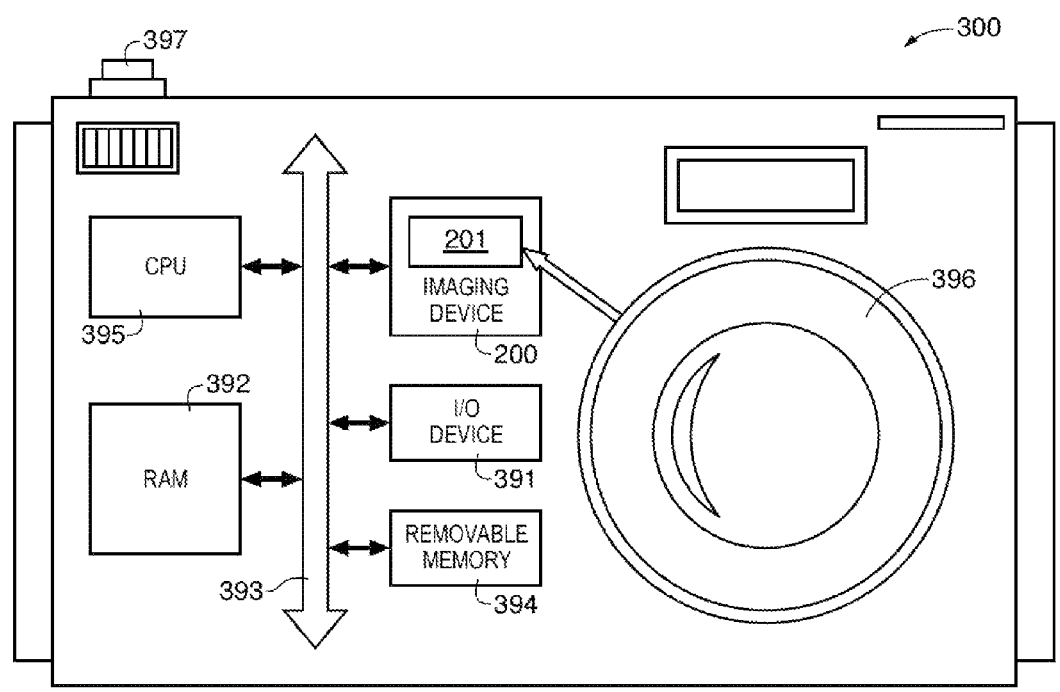
FIG. 11 is a block diagram of a processor system employing the embodiments of FIGS. 1-10 in accordance with an embodiment of the present invention.

FIG. 11 shows in simplified form a typical processor system 300, such as a digital camera, which includes an imaging device such as imaging device 200 (e.g., an imaging device 200 such as camera module 12 of FIG. 1 employing a image processing engine such as image processing engine 20 of FIGS. 2 and 4 configured to capture multiple image frames and generate motion-compensated high-dynamic-range images using the multiple captured image frames as described in FIGS. 1-10. Processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

Processor system 300, which may be a digital still or video camera system, may include a lens such as lens 396 for focusing an image onto a pixel array such as pixel array 201 when shutter release button 397 is pressed. Processor system 300 may include a central processing unit such as central processing unit (CPU) 395. CPU 395 may be a microprocessor that controls camera functions and one or more image flow functions and communicates with one or more input/output (I/O) devices 391 over a bus such as bus 393. Imaging device 200 may also communicate with CPU 395 over bus 393. System 300 may include random access memory (RAM) 392 and removable memory 394. Removable memory 394 may include flash memory that communicates with CPU 395 over bus 393. Imaging device 200 may be combined with CPU 395, with or without memory storage, on a single integrated circuit or on a different chip. Although bus 393 is illustrated as a single bus, it may be one or more buses or bridges or other communication paths used to interconnect the system components.

Various embodiments have been described illustrating systems and methods for generating motion-compensated HDR images of a scene containing one or more moving objects using a camera module having an image sensor and processing circuitry. The motion-compensation method may include using an image pixel array on the image sensor to capture subsequent first and second interleaved images that include the moving object and using processing circuitry to generate a motion mask. Each interleaved image may include rows of long-exposure image pixel values that are interleaved with rows of short-exposure image pixel values. A portion of the array of image pixels (e.g., a set of rows of image pixels) may be used to generate the short-exposure image pixel values in the first interleaved image and the long-exposure image pixel values in the second interleaved image. A second portion of the array of image pixels (e.g., an additional set of rows of image pixels) may be used to generate the long-exposure image pixel values in the first interleaved image and the short-exposure image pixel values in the second interleaved image.

The first interleaved image may have short-exposure image pixel values at a first set of pixel locations and long-exposure image pixel values at a second set of pixel locations. The second interleaved image may have long-exposure image pixel values at the first set of pixel locations and short-exposure image pixel values at the second set of pixel locations.

The long-exposure image pixel values and the short-exposure image pixel values in each interleaved image may be interpolated to form interpolated long-exposure image pixel values and interpolated short-exposure image pixel values. A final (combined) long-exposure image and a final (combined) short-exposure image may be generated using the long-exposure image pixel values and the short-exposure image pixel values from the interleaved images along with the interpolated long-exposure image pixel values and short-exposure image pixel values from a selected one of the interleaved image frames. The final (combined) long-exposure image and the final (combined) short-exposure image may each include image pixel values from either or both of the first and second interleaved image frames in a non-motion region and image pixel values based only on image pixel values or interpolated values from the selected one of the interleaved images in a motion region. High-dynamic-range images may be generated using the final long-exposure and short-exposure images.

The foregoing is merely illustrative of the principles of this invention which can be practiced in other embodiments.

What is claimed is:

1. A method of using an image sensor and processing circuitry in an electronic device to generate a motion-compensated high-dynamic-range image of a scene containing a moving object, the method comprising:
    with the image sensor, capturing first and second images, wherein the first and second images each include long-exposure image pixel values and short-exposure image pixel values;
    with the processing circuitry, generating an interpolated long-exposure image from the first image;
    with the processing circuitry, generating an interpolated short-exposure image from the first image;
    with the processing circuitry, generating a long-exposure image that includes image pixel values from the first image, the second image, and the interpolated long-exposure image;
    with the processing circuitry, generating a short-exposure image that includes image pixel values from the first image, the second image, and the interpolated short-exposure image; and
    with the processing circuitry, generating the motion-compensated high-dynamic-range image using the long-exposure image and the short-exposure image.

2. The method defined in claim 1, further comprising:
    with the processing circuitry, generating a reconstruction map having reconstruction map pixel values.

3. The method defined in claim 2 wherein generating the long-exposure image that includes the image pixel values from the first image, the second image, and the interpolated long-exposure image comprises selecting the image pixel values from the first image, the second image, and the interpolated long-exposure image based on the reconstruction map pixel values.

4. The method defined in claim 3 wherein generating the short-exposure image that includes the image pixel values from the first image, the second image, and the interpolated short-exposure image comprises selecting the image pixel values from the first image, the second image, and the interpolated short-exposure image based on the reconstruction map pixel values.

5. The method defined in claim 4, further comprising:
    generating a motion map using the first and second images.

6. The method defined in claim 5, further comprising:
    generating first and second edge maps using the first and second images.

7. The method defined in claim 6 wherein generating the reconstruction map comprises generating the reconstruction map using the motion map and the first and second edge maps.

8. The method defined in claim 7, further comprising:
    selecting the first image as a reference image based on the motion map and the first and second edge maps.

9. The method defined in claim 8 wherein generating the motion-compensated high-dynamic-range image using the long-exposure image and the short-exposure image comprises generating image pixel values for the motion-compensated high-dynamic-range image using a linear combination of image pixel values from the long-exposure image and the short-exposure.

10. The method defined in claim 9 wherein capturing the first and second images comprises capturing the first image using first and second exposure times and capturing the second image using the first and second exposure times.

11. The method defined in claim 10 wherein capturing the first image using the first and second exposure times comprises:
    capturing a first row of image pixel values using the first exposure time; and
    capturing a second row of image pixel values using the second exposure time.

12. A method of capturing images, comprising:
    capturing a first interleaved image having rows of long-exposure image pixel values that are interleaved with rows of short-exposure image pixel values;
    capturing a second interleaved image having rows of short-exposure image pixel values that are interleaved with rows of long-exposure image pixel values;
    detecting a motion region using the first interleaved image and the second interleaved image;
    selecting either the first interleaved image or the second interleaved image as a reference image; and
    generating a high-dynamic-range image by generating image pixel values in the motion region that are based exclusively on the long-exposure image pixel values and the short-exposure image pixel values from the interleaved image that was selected as the reference image.

13. The method defined in claim 12 wherein generating the high-dynamic-range image further comprises generating image pixel values outside the motion region based on the long-exposure image pixel values and the short-exposure image pixel values in the first and second interleaved images.

14. The method defined in claim 13 wherein detecting the motion region using the first interleaved image and the second interleaved image comprises generating a motion map having motion map pixel values that indicate the motion region.

15. The method defined in claim 14, further comprising:
detecting edge regions in the first interleaved image and the second interleaved image.

16. The method defined in claim 15, further comprising:
generating a reconstruction map based on the motion map and the detected edge regions.

17. The method defined in claim 16 wherein generating the high-dynamic-range image by generating image pixel values in the motion region that are based exclusively on the long-exposure image pixel values and the short-exposure image pixel values from the interleaved image that was selected as the reference image comprises:
generating the image pixel values in the motion region based exclusively on the long-exposure image pixel values and the short-exposure image pixel values from the interleaved image that was selected as the reference image using the reconstruction map.

18. The method defined in claim 16 wherein generating the image pixel values in the motion region that are based exclusively on the long-exposure image pixel values and the short-exposure image pixel values from the interleaved image that was selected as the reference image comprises:
interpolating the long-exposure image pixel values from the interleaved image that was selected as the reference image; and
generating the image pixel values in the motion region using the interpolated long-exposure image pixel values.

19. The method defined in claim 18 wherein generating the image pixel values in the motion region that are based exclusively on the long-exposure image pixel values and the short-exposure image pixel values from the interleaved image that was selected as the reference image further comprises:
interpolating the short-exposure image pixel values from the interleaved image that was selected as the reference image; and
generating the image pixel values in the motion region using the interpolated short-exposure image pixel values.

20. A system, comprising:
a central processing unit;
memory;
input-output circuitry; and
an imaging device, wherein the imaging device comprises:
an image sensor configured to capture first and second interleaved images each having rows of short-exposure image pixel values that are interleaved with rows of long-exposure image pixel values; and
circuitry configured to detect a motion region using the first and second interleaved images, select either the first interleaved image or the second interleaved image as a reference image, and generate a high-dynamic-range image having image pixel values in the motion region that are based exclusively on the long-exposure image pixel values and the short-exposure image pixel values from the interleaved image that was selected as the reference image.

21. The system defined in claim 20 wherein the image sensor includes an array of image pixels and wherein a portion of the array of image pixels is configured to generate the short-exposure image pixel values in the first interleaved image and the long-exposure image pixel values in the second interleaved image.

* * * * *